US008471728B2

(12) United States Patent
Flaherty

(10) Patent No.: US 8,471,728 B2
(45) Date of Patent: Jun. 25, 2013

(54) TRAFFIC MANAGEMENT SYSTEMS AND METHODS OF INFORMING VEHICLE OPERATORS OF TRAFFIC SIGNAL STATES

(76) Inventor: Michael Flaherty, Wellesley, MA (US)

( * ) Notice: Subject to any disclaimer, the term of this patent is extended or adjusted under 35 U.S.C. 154(b) by 323 days.

(21) Appl. No.: 12/884,518

(22) Filed: Sep. 17, 2010

(65) Prior Publication Data

US 2011/0068950 A1 Mar. 24, 2011

Related U.S. Application Data

(60) Provisional application No. 61/243,802, filed on Sep. 18, 2009.

(51) Int. Cl.
*G08G 1/09* (2006.01)
*G08G 1/096* (2006.01)
*G06F 19/00* (2011.01)

(52) U.S. Cl.
USPC ........... 340/905; 340/911; 340/920; 340/929; 340/926; 701/119

(58) Field of Classification Search
USPC .................................. 340/905, 911, 920, 929
See application file for complete search history.

(56) References Cited

U.S. PATENT DOCUMENTS 4,059,821 A 11/1977 Nicholls
5,548,515 A 8/1996 Pilley et al.
5,940,010 A * 8/1999 Sasaki et al. .................. 340/901
6,470,263 B2 * 10/2002 Ito et al. ........................ 701/408
6,694,247 B2 2/2004 Hameleers et al.
6,909,380 B2 6/2005 Brooke
7,098,806 B2 8/2006 Bachelder
7,324,893 B2 1/2008 Yamashita et al.
7,755,510 B2 7/2010 Bilimoria et al.
2002/0065599 A1 5/2002 Hameleers et al.
2007/0061155 A1 3/2007 Ji et al.
2008/0012726 A1 1/2008 Publicover
2008/0019269 A1 1/2008 Bisdikian et al.
2008/0030372 A1 * 2/2008 Lu ................................ 340/929
2008/0059050 A1 3/2008 Lin et al.
2008/0167795 A1 7/2008 Bisdikian et al.

OTHER PUBLICATIONS

U.S. Department of Transportation: Federal Highway Administration. "Chapter 3: Traffic Signal Control Systems," Advanced Transportation Management Technologies: Demonstration Project No. 105, Apr. 1997, pp. 1-28, Publication No. FHWA-SA-97-058.
Chaudhary, Nadeem A., et al. "Platoon Identification and Accommodation System for Isolated Traffic Signals on Arterials," Sep. 2003, pp. 1-64, Texas Transportation Institute, The Texas A&M University System, College Station, Texas.

* cited by examiner

*Primary Examiner* — Donnie Crosland
(74) *Attorney, Agent, or Firm* — Onello & Mello, LLP

(57) ABSTRACT

A traffic management system and method are provided that determine and present a target speed for a vehicle to travel from a first position to a second position when a signaling device at the second position is in a desired phase. The target average speed can be presented via a variety of output devices, such as a display and/or speaker. The output device could, for example, be stationary, at a fixed distance from the signaling device, such as a roadside display. The output device could be a mobile device, carried in a vehicle or by a user, e.g., a cell phone, GPS navigation system, or personal digital assistant. The system can include a signal timing processor that determines a target average speed of travel between the first and second positions, which can be based on, or calculated from, timing information of the signals and a distance between the two positions.

16 Claims, 9 Drawing Sheets

TRAFFIC MANAGEMENT SYSTEMS AND METHODS OF INFORMING VEHICLE OPERATORS OF TRAFFIC SIGNAL STATES

CROSS REFERENCES TO RELATED APPLICATIONS

This application claims the benefit of priority under 35 U.S.C. §119(e) from co-pending, commonly owned U.S. provisional patent application Ser. No. 61/243,802, entitled TRAFFIC MANAGEMENT SYSTEMS AND METHODS OF INFORMING VEHICLE OPERATORS OF TRAFFIC SIGNAL STATES, filed Sep. 18, 2009, the entirety of which is incorporated herein by reference.

BACKGROUND

Traffic signals, also referred to as traffic lights or stop lights, are signaling devices generally positioned at an intersection between two or more roads, paths, crosswalks, tracks, etc. to control flows of traffic competing to enter to the intersection.

In order to control which flow of traffic can enter the intersection, each traffic signal produces a well-known color code to notify each user, e.g., vehicle operator, pedestrian, etc., at the intersection whether the user may proceed through the intersection.

For example, traffic signals at roadway intersections generally consist of three lights: red, amber (commonly referred to as yellow), and green. The red light, when illuminated, indicates to a vehicle operator that he must stop at the intersection until the green light or yellow light is illuminated. The yellow light, when illuminated, indicates to a vehicle operator entering an intersection that he has "right-of-way" access to the intersection, and that he may cross the intersection, but must proceed with caution in doing so. The yellow light may indicate an intermediate state in a transition from green to red. The green light, when illuminated, also indicates to a vehicle operator that he has right-of-way access, and can safely enter the intersection.

It is important that traffic signals operate to promote vehicle and pedestrian safety by controlling conflicting flows of traffic at an intersection in an organized manner with minimal delay at the intersection, which can otherwise lead to traffic congestion, or result in personal injury or vehicle damage caused by collisions at the intersection by aggressive drivers "running the red light," or caused by vehicles abruptly stopping at the intersection when improperly notified of an impending red light.

In addition, traffic congestion at intersections results in wasteful fuel consumption. In fact, some studies have shown in an average of 60 hours of delay per year per driver results from such congestion. In the United States alone, over 2.9 billion gallons of gasoline are consumed each year due to traffic congestion. The environmental impact is also an issue, with automobile exhaust containing air pollutants, such as carbon dioxide ($CO_2$) being emitted while drivers sit idle. For example, each gallon of gasoline burned can add approximately 19.5 lbs of $CO_2$ to the atmosphere.

Traffic planning engineers are often retained to study such traffic congestion issues and to provide solutions to these issues in order to improve traffic flow, and thereby reduce traffic congestion.

One approach used by traffic planning engineers to manage traffic flows through a succession of intersections is to coordinate the timing of traffic signals at the intersections, which permits a higher volume of traffic to safely move through the intersections with fewer stops and minimal acceleration and braking. However, vehicle operator behavior is difficult to predict and operator responses to well-timed signals can be erratic, misguided, and possibly conflict with the goals of a traffic planning engineer.

FIG. 1 is a graph illustrating various driver behaviors when proceeding through four successive traffic signals A-D.

As shown in FIG. 1, vehicle 1 passes through a first traffic signal A in a green signal state, i.e., the green light is illuminated, but is driving considerably fast such that vehicle 1 approaches a subsequent second traffic signal B in a red signal state, i.e., the red light is illuminated. Vehicle 2 likewise passes through the first traffic signal A in a green signal state, but is driving considerably slower, so that vehicle 2 also approaches a subsequent second traffic signal B in a red signal state. Thus, while traffic signals A-D are timed for vehicles that drive within a predetermined range of speeds, vehicles that drive too fast or too slow, such as vehicles 1 and 2, are likely to encounter a traffic signal in a red signal state, not a preferable green signal state. Vehicle 3, for example, travels at an optimal speed that permits vehicle 3 to enter each intersection when each corresponding traffic signal A-D is in the green signal state. Since there is no way for the operator of vehicle 3 to know when a given traffic signal will enter a red signal state, vehicle 3 must rely on the proper timing of the traffic signals and a presumption that the speed limit represents the optimal speed, assuming unabated travel. However, unabated travel at the speed limit from one traffic signal to the next is rarely achievable. Slowdowns and stoppages between traffic signals are commonplace.

SUMMARY

In accordance with aspects of the invention, a traffic management system comprises a signal timing processor that determines a target average speed of travel between a first position and a second position that must be achieved by a vehicle to reach the second position when a signaling device proximal to the second position is in a first color phase; and a display that displays the target average speed of travel.

In accordance with one aspect of the invention, provided is a traffic management system. The system comprises a signal timing processor configured to determine a target average speed of travel between a first position and a second position that must be achieved by a vehicle at the first position to reach the second position when a signaling device proximal to the second position is in a first state of a plurality of states; and an output device that output the target average speed at the vehicle.

The first state can be a go state.

The signaling device can be a traffic signal.

The traffic signal can include a green light, an amber light, and a red light, and the green light is the first state.

The output device can be a stationary roadside device that includes a display of the target average speed.

The output device can be a mobile device that includes at least one of a display and an audio output device.

The mobile device can be a smart phone.

The signal timing processor can be part of the smart phone, or remote to the smart phone.

The mobile device can be a portable GPS-enabled device.

The mobile device can be an in-vehicle navigation system, communication system, or safety system.

The output device can display the target average speed as a number of miles per hour or kilometers per hour.

The output device can include a first region that displays the target average speed and a second region that displays a second set of information.

The second region can include a company logo.

The second region can be a dynamic display.

The dynamic display can display one or more of alerts, advertisements, temperature, and travel information.

The output device can include a graphics display.

The signal timing processor can be configured to determine a target average speed based on a set of inputs including a distance between the first and second positions and traffic signal sequence information.

The set of inputs can further include at least one speed limit.

The set of inputs can include traffic congestion information.

The system can further comprise a motion detector that activates at least one of the signal timing processor and the output device in response to a detected motion of the vehicle.

In various embodiments, the system can be configured to communicate with a local signal controller that communicates with the signaling device and provides timing information related to the first color phase to the signal timing processor.

In accordance with another aspect of the invention, provided is a traffic management system. The system comprises a signal timing processor configured to determine a target average speed of travel between a first position and a second position that must be achieved by a vehicle at the first position to reach the second position when a traffic signal at the second position is in go state; and a display device that outputs the target average speed as a number that is visible from the vehicle. The signal timing processor is configured to determine a target average speed based on a set of inputs including a distance between the first and second positions and traffic signal sequence information.

In accordance with another aspect of the invention, provided is a method of informing an operator of a vehicle of target average speed to travel to arrive at a multi-state signaling device when the signaling device is in a go state. The method comprises storing a location of the multi-state signaling device in a memory; determining a vehicle location; receiving information indicating a timing sequence and state of the multi-state signaling device; a signal timing processor determining the target average speed of travel between vehicle position and the multi-state signaling device that must be achieved to reach the multi-state signaling device during the go state; and outputting the target average speed of travel at the vehicle.

The go state can be a green light.

In different embodiments, the display may be located or presented at a roadside, in the vehicle, on a personal digital assistant, smart phone, or navigation system, in-vehicle system, or some combination thereof.

In accordance with another aspect of the invention, provided is a method of informing an operator of a vehicle of an optimal speed to travel through intersections. The method comprises determining a target average speed of travel between a first position and a second position that must be achieved to reach the second position when a traffic signal proximal to the second position is in a first color phase; and displaying the target average speed of travel proximate to the first position.

BRIEF DESCRIPTION OF THE DRAWINGS

Example embodiments will be more clearly understood from the following detailed description taken in conjunction with the accompanying drawings. The drawings depict preferred embodiments by way of example, not by way of limitation. In the drawings, like reference numerals refer to the same or similar elements, wherein.

DETAILED DESCRIPTION OF THE EMBODIMENTS

Figure 1:
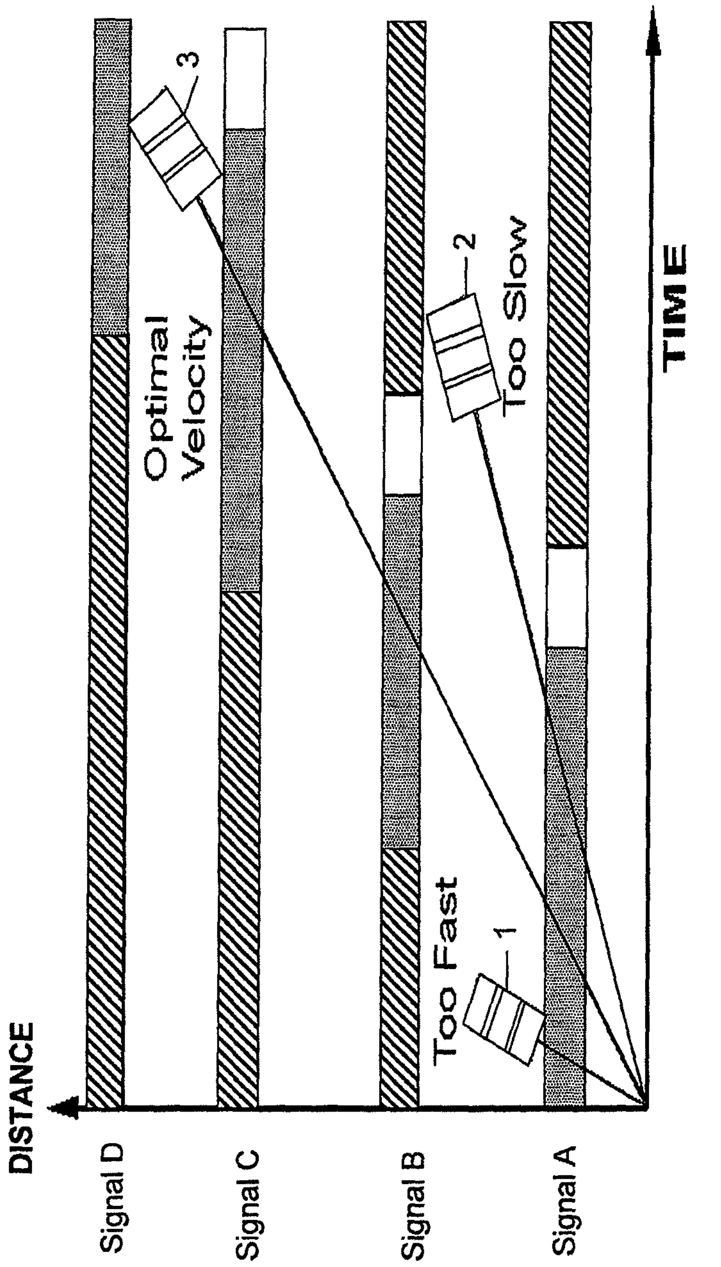
FIG. 1 (PRIOR ART)
FIG. 1 is a graph illustrating various driver behaviors when proceeding through a plurality of successive traffic signals.

Various example embodiments will be described more fully hereinafter with reference to the accompanying drawings, in which some example embodiments are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular example embodiments only and is not intended to be limiting of the present invention. As used herein, the singular forms “a,” “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

Hereinafter, example embodiments will be explained with reference to the accompanying drawings.

In order to overcome the limitations described above with regard to conventional approaches to managing traffic flows through one or more intersections, which include traffic signals, it is desirable to inform a vehicle operator well in advance of a traffic signal of an optimal speed in order to reach the traffic signal when the green light of the traffic signal is illuminated. For example, with regard to FIG. 1, it is preferable to notify vehicles 1-3 in advance of entering an intersection having a traffic signal of the optimal speed at which to travel in order to maximize the probability of proceeding through a green traffic light at a relatively constant speed, see for example, vehicle 3 in FIG. 1, as opposed to stopping at a red traffic light, see for example, vehicles 1 and 2 of FIG. 1. Accordingly, a traffic management system in accordance with aspects of the present invention is provided that displays a target average speed of travel, as an optimal speed, to a vehicle operator in advance of the traffic signal so that that the vehicle operator can adjust his speed in order to enter an intersection when a green traffic light is illuminated. The target average speed should not exceed the speed limit, and may take traffic congestion into consideration.

Figure 2:
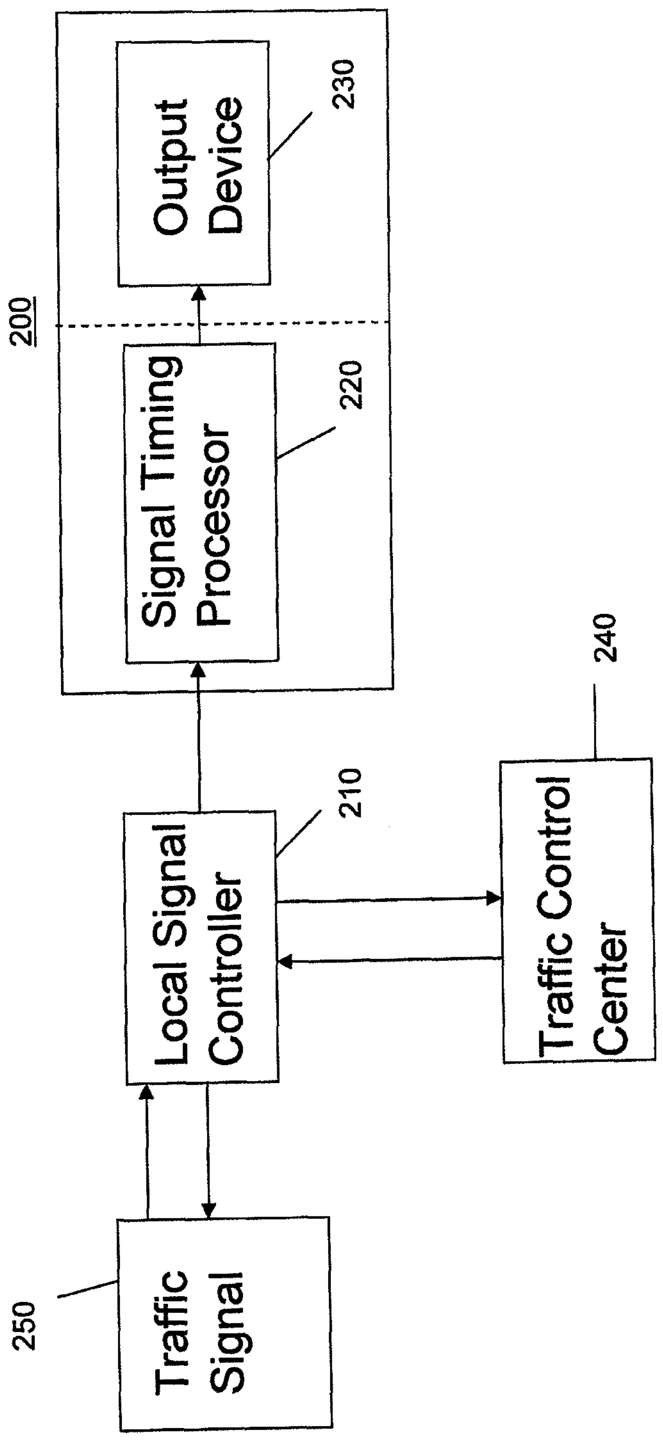
FIG. 2 is a system level block diagram of an embodiment of a traffic management system, in accordance with aspects of the present invention.

FIG. 2 is a system level block diagram of an embodiment of a traffic management system 200 in accordance with aspects of the present invention.

In this embodiment, the system 200 comprises a signal timing processor 220 and an output device 230, e.g., a display, speaker, or combination thereof. Thus, the output at output device 230 could include text, numbers, graphics, video, audio, or combinations thereof. As will be appreciated by those skilled in the art, the signal timing processor 220 and output device 230 may be part of the same device or part of different devices.

The system 200 can communicate with one or more local signal controllers 210, also referred to as local intersection controllers, which, in turn, communicate with one or more signaling devices 250. In an embodiment, the local signal controller 210 provides signal controls to one or more multi-state signaling devices 250. In an embodiment, the local signal controller 210 can comprise a Model 2070 controller, which is known to those of ordinary skill in the art, or another controller that provides at least the required features for traffic signal control.

Here, the one or more multi-state signaling devices 250 is a traffic signal, also referred to as a traffic light or stop light. In this example, the traffic signal 250 includes at least three states, a red light, an amber light (also referred to as a “yellow” light), and a green light (a “go” state), which typically are sequentially illuminated at fixed intervals, or phases (states), according to a pre-timed operation that implements a defined timing sequence or cycle. In other embodiments, the different lights could be illuminated according to an actuated operation, wherein a control algorithm is provided that determines a start time for illumination of the red, yellow, and green lights, the duration of the interval or phase of each light, and an end time for each light.

As an example, successive traffic lights on the same street could use the same timing cycle, e.g., a 100 second cycle. The timing from light-to-light could be offset based on the distance between lights and the speed limits, to attempt to achieve a smooth and efficient flow of traffic. The 100 second cycle could consist of 5 seconds for yellow, 40 seconds for red, and 55 seconds for green, as an example. Cross streets would also have a 100 second cycle, which could be apportioned differently, e.g., 5 seconds for yellow, 60 seconds for red, and 35 seconds for green.

The system 200 can interface and communicate with a conventional traffic signal control system, which can include, but is not limited to, a network of intersection traffic signals, a communications network to which the intersection traffic signals are connected, and a traffic control center that manages the traffic signal control system. In this embodiment, the local signal controller 210 communicates with a traffic control center 240 that controls and/or monitors the traffic signals. For example, the timing sequence (and/or cycle) and offset information for the traffic signals 250 can be known by the traffic control center 240.

The local signal controller 210, traffic signaling devices 250, and traffic control center 240 can communicate with each other via a communications network known to those of ordinary skill in the art. The traffic control center 240 can manage a network of traffic signals 250 and local signal controllers 210 so that traffic flow objectives can be achieved. In some embodiments, the traffic control center 240 can be configured to monitor traffic at one or more intersections and adjust traffic signal timing to improve traffic flow through the intersections. In an embodiment, the traffic control center 240 could program a network of traffic signals 250 to meet network-wide objectives for traffic flow, for example, traffic signals in the group operating at a similar cycle length.

The local signal controller 210 comprises an I/O controller and an interface that enables communication between the controller 210 and the signal timing processor 220; the interface information is known in the art. In some embodiments, the interface can be a wireless modem interface. In various embodiments, the local signal controller 210 communicates with the signal timing processor 220 by transmitting signals wirelessly, or via direct connection, or via the Internet, a satellite network, a cellular network, etc., or some combination thereof. In this embodiment, the local signal controller 210 generates signals that comply with industry standards, and are well-known to those of ordinary skill in the art, such as signal cycle times, advanced signals, such as emergency vehicle detection, transit vehicle detection, extended green or advanced volume detection, left turn vehicle detection, and the like.

The local signal controller 210 provides signals to the signal timing processor 220 relating to a color phase of the traffic signal 250. The color phase can be a green phase, a yellow phase, or a red phase. In this manner, the traffic signal 250 typically includes a green light that is illuminated in the green phase, a yellow light that is illuminated in the yellow phase, and a red light that is illuminated in the red phase. A typical traffic signal 250 includes contact closures that open and close in order to illuminate the green, yellow, and red lights. In such an embodiment, the local signal controller 210 polls and senses green phase contact closures indicating that the traffic signal 250 is in a green phase, and that the green light is illuminated, and transmits information related to the timing of the green light illumination to the signal timing processor 220.

In the present embodiment, once the timing of the light, or time to an appropriate green phase, is known to the signal timing processor 220, an optimal speed for a vehicle operator at the location of the output device 230 can be determined. Preferably, the "optimal" speed is an average speed of vehicle travel required to pass the traffic signal 250 when the green light is illuminated, without exceeding the speed limit. In some embodiments, the signal timing processor 220 determines the optimal speed.

The signal timing processor 220 determines a target average speed of travel between the first and second positions based on, or calculated from, timing information of the signals and a distance between the two positions, i.e., the traffic signal 250 and the position of the output device 230. In the present embodiment, this determination can be based on the timing sequence information received from the local signal controller 210 or traffic control center 240 and the distance to a position proximal to the traffic signal 250 from the output device 230. For example, the local signal controller 210 or traffic control center 240 could transmit an output signal to the signal timing processor 220 that indicates the time remaining until the traffic signal phase changes to amber, red, or green.

Figure 3:
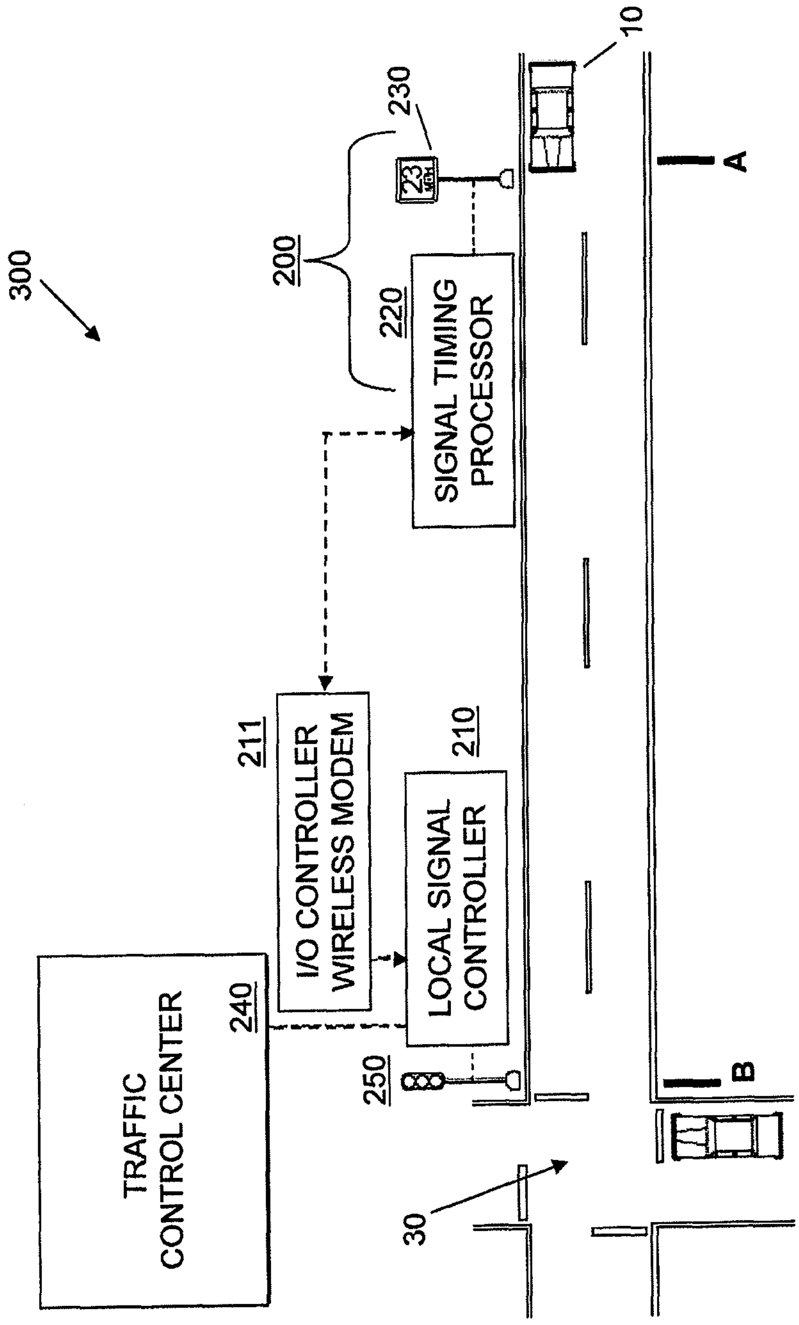
FIG. 3 is a view of an embodiment of a traffic management system, in accordance with aspects of the present invention.

In this embodiment, the signal timing processor 220 (e.g., a programmable logic controller (PLC)) is collocated with the output device 230, which, as shown in FIG. 3. can be a stationary roadside display that is visible to a passing vehicle operator. The distance between the output device 230 and traffic signal 250 is known to or calculable by the signal timing processor 220. For instance, in one embodiment, the signal timing processor 220 can receive the output signal indicating the time remaining until the traffic signal phase changes to green and, together with the known distance from the output 230 to the traffic signal 250, and perhaps the timing duration (e.g., 100 second timing cycle, where yellow=5 seconds, red=45 seconds, and green=50 seconds) calculates the recommended target vehicle speed.

The calculation could also take into account traffic congestion. For example, it could be determined that calculating a target average speed of 25 mph is not beneficial, when traffic congestion dictates that a top speed of more that 20 mph is not possible. Thus, if traffic ahead is moving very slowly, the target average speed could be slower than if traffic was light and moving relatively freely, which could allow the vehicle to pass the traffic signal 250 in the green phase of a later cycle. Therefore, the signal timing processor could also receive a traffic congestion input, or otherwise use a stored traffic congestion parameter, that reflects average traffic speeds and/or volumes at different points in the day. In some embodiments, the traffic congestion parameter could be a real-time, or near-real time, feed from an external traffic monitoring source, or from traffic control center 240.

In other embodiments, the signal timing processor 220 and the output device 230 or simply the output device 230 can be non-stationary or mobile. (See, e.g., FIG. 8) For example, the signal timing processor 220 could be stationary and positioned roadside at a predetermined distance from the traffic signal 250 and wirelessly communicate with a mobile output device 230. In other embodiments, the signal timing processor 220 could be at the traffic control center 240, with distance of a mobile output device 230 to the traffic signal determined, for example, by GPS coordinates of the traffic signal and display (or vehicle).

In some of these embodiments, the output device 230 could be the display of a smart phone, global positioning system (GPS) unit (e.g., a navigation system), personal digital assistant (PDA), onboard vehicle information system, or the like that runs an application that processes information and data received from a remote signal timing processor 220, local signal controller 210, and/or traffic control center 240. In such cases, one or more of the local signal controller 210, signal timing processor 220, and traffic control center 240 can communicate wirelessly with a mobile output device 230.

In some embodiments, the signal timing processor 220 can be configured to receive, e.g., from local signal controller 210 or traffic control center 240, information that includes information related to emergency vehicle detection, transit vehicle detection, left turn vehicle detection, advance traffic volume detection, and the like, wherein the green light can be illuminated for an extended period of time, or other signals are available to the local signal controller 210.

In this embodiment, the output device 230 receives the target speed information from the signal timing processor 220 and outputs the optimal speed in real-time, e.g., posts the target average speed on a digital display 230 to communicate the travel speed necessary for a vehicle to enter the next intersection at a time when the green light is illuminated. The optimal or average target speed should not exceed the speed limit in this embodiment, and can account for traffic congestion, as discussed above.

In some embodiments, the output device 230 can display the optimal speed and information received from other sources. For example, the output device 230 can interface with the Internet and receive news, sports, ads, weather, and/or traffic reports, emergency notices, and the like, which can be displayed on output device 230, e.g., with the optimal speed. The output device 230 can also include a region for other information to be prominently displayed to a vehicle operator, for example, a static or dynamic company logo, public awareness advertisement, or emergency alert.

Figure 4:
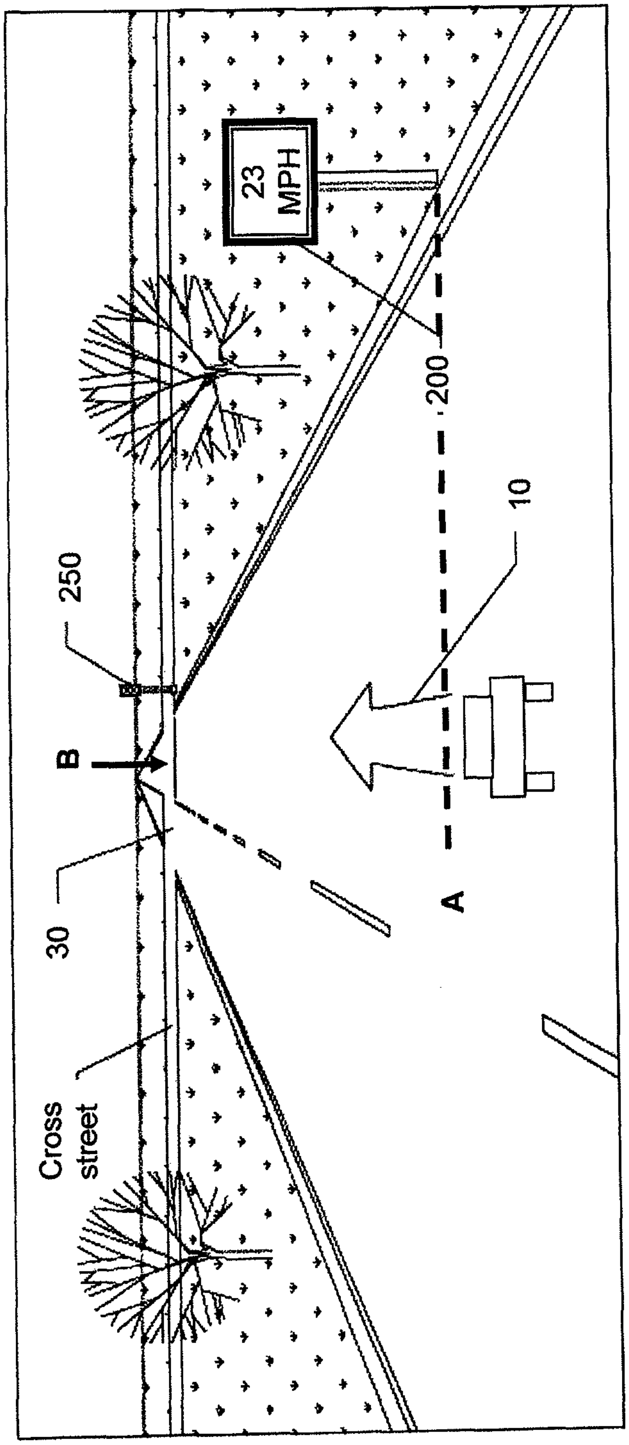
FIG. 4 is another view of the embodiment of the traffic management system of FIG. 3.

FIG. 3 is a view of an embodiment of a traffic management system 200 in accordance with aspects of the present invention. FIG. 4 is another view of the embodiment of the traffic management system of FIG. 3. In this embodiment, system 200 is a stationary roadside system. Otherwise, the teachings of this embodiment could be applied to other embodiments.

As shown in FIGS. 3 and 4, the output device 230 includes a display that prominently displays a target average speed of travel at which the vehicle 10 can move between positions A and B such that the traffic signal 250 is in a green phase, i.e., green light is illuminated, when the vehicle 10 enters an intersection 30 at which is positioned the traffic signal 250. For example, as shown in FIGS. 3 and 4, display 230 indicates that the vehicle 10 can travel between position A and position B at an average speed of "23 MPH" in order to reach the intersection 30 when the traffic signal 250 is in a green phase, i.e., a green light is illuminated.

In this embodiment, during operation of the traffic management system 200, the signal timing processor 220 receives timing sequence information from local signal controller 210, which communicates with traffic signal 250, and determines the target average speed from this information, as well as from a predetermined distance between position A and position B. The timing sequence information preferably includes information related to the remaining time before the signal 250 changes state, for example, from an illuminated green light to an illuminated yellow light. In this embodiment, the local signal controller 210 communicates with the signal timing processor 220 via an I/O controller and wireless modem 211.

In some embodiments, the traffic control center 240 can communicate with the local signal controller 210 to provide control signals to change the timing, sequence, etc. of the traffic signal lights. These changes can be scheduled or the result of interrupts. For example, a scheduled change could be one where the yellow light continuously flashes during the night, but where the red, yellow, and green lights sequentially illuminate during a specified set of times that includes the daytime. For various reasons, therefore, the local signal controller can send information to the signal timing processor 220 in real-time, or at predetermined times.

Figure 5:
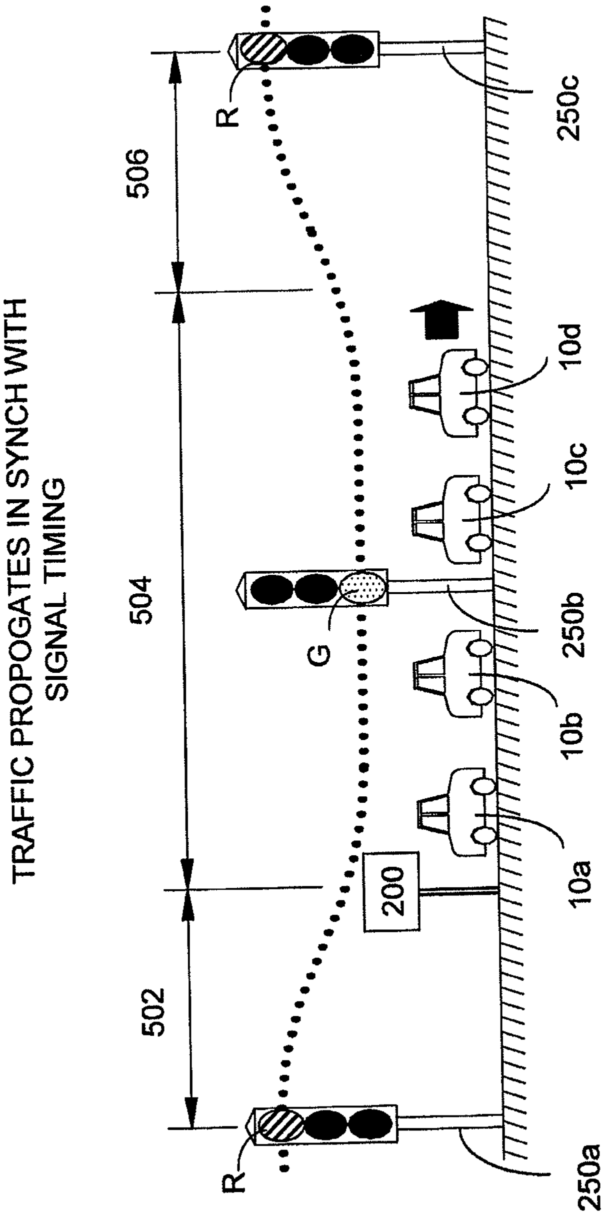
FIG. 5 is a diagram illustrating a platoon of vehicles moving through a plurality of traffic signals, in accordance with aspects of the present invention.

FIG. 5 is a diagram illustrating a platoon of vehicles 10*a-d* moving through a plurality of traffic signals 250*a-c* in accordance with aspects of the present invention. After vehicles 10*a-d* move through a first traffic signal 250*a*, the operators of vehicles 10*a-d* can exhibit a typical driver behavior pattern, whereby one or more vehicles in the platoon of vehicles 10*a-d* will accelerate in region 502 with the intention of passing through the second traffic signal 250*b*, to "make the green light" (G) at traffic signal 250*b*. However, the traffic management system 200 includes a display at region 504 between the first traffic signal 250*a* and second traffic signal 250*b*. The display 230 notifies vehicle operators of the necessary speed at which to travel in region 504 in order to synchronize their travel through at least traffic signal 250*b*, and preferably also traffic signal 250*c*. Therefore, the platoon of vehicles can pass through the second traffic signal 250*b* when the green light (G) thereof is illuminated and then the third traffic signal 250*c* when the green light (G) thereof is illuminated. As a result, vehicle operators who would otherwise drive at higher speeds may be coaxed to drive at slower speeds in response to this displayed information. Similarly, vehicle operators who would otherwise drive at slower speeds may be coaxed to drive at higher speeds in response to the displayed information. Accordingly, vehicles 10*a*-10*d* can travel through the traffic signals 250*a*-250*c* in an efficient manner as a platoon, traveling in synchronization with the timing of each green traffic signal 250*a-c*. Thus, when each vehicle operator in the platoon complies with the displayed speed, traffic congestion can be reduced. As a result, fuel consumption and pollution are also reduced.

After vehicles 10*a-d* move through traffic signal 250*b*, a typical driver will tend to slow down when approaching a red light (R) at the third traffic signal 250*c*. However, a vehicle complying with the recommended speed of display of the system 200 will reach the third traffic signal 250*c* in region 506 when the green light of the third traffic signal 250*c* is illuminated, even though the red light is illuminated as the vehicle approaches the third traffic signal 250*c*.

Figure 6:
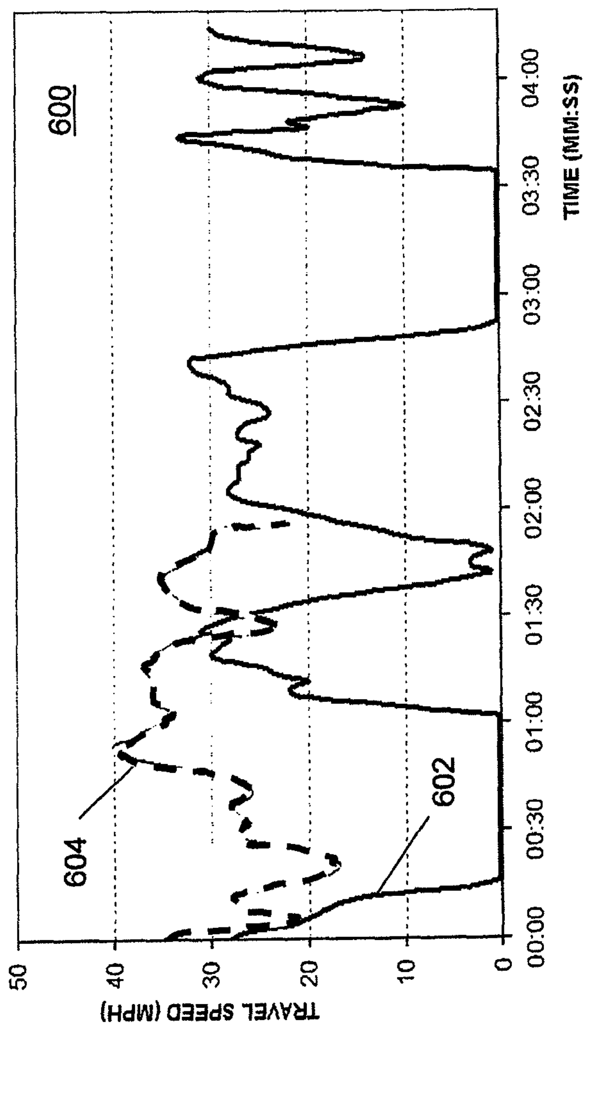
FIG. 6 is a graph illustrating time-trial result comparisons between conventional traffic and traffic using the traffic management system of FIGS. 2-5.

FIG. 6 is a graph 600 illustrating time-trial result comparisons between conventional traffic and traffic using the traffic management system of FIGS. 2-5. As shown in FIG. 6, the solid line 602 indicates a speed of a vehicle over time as the vehicle travels along a roadway that includes a plurality of traffic signals, in accordance with a conventional driving behavior. The dashed line 604 indicates a speed of a vehicle over time as the vehicle travels along the same roadway, but with the benefit of the traffic management system described herein. As FIG. 6 indicates, the conventional approach results in several steps, where speed is 0 at traffic lights along the roadway. However, the dashed line does not reach speeds close to 0 as that vehicle travels through the same roadway, and intersections.

Figure 7:
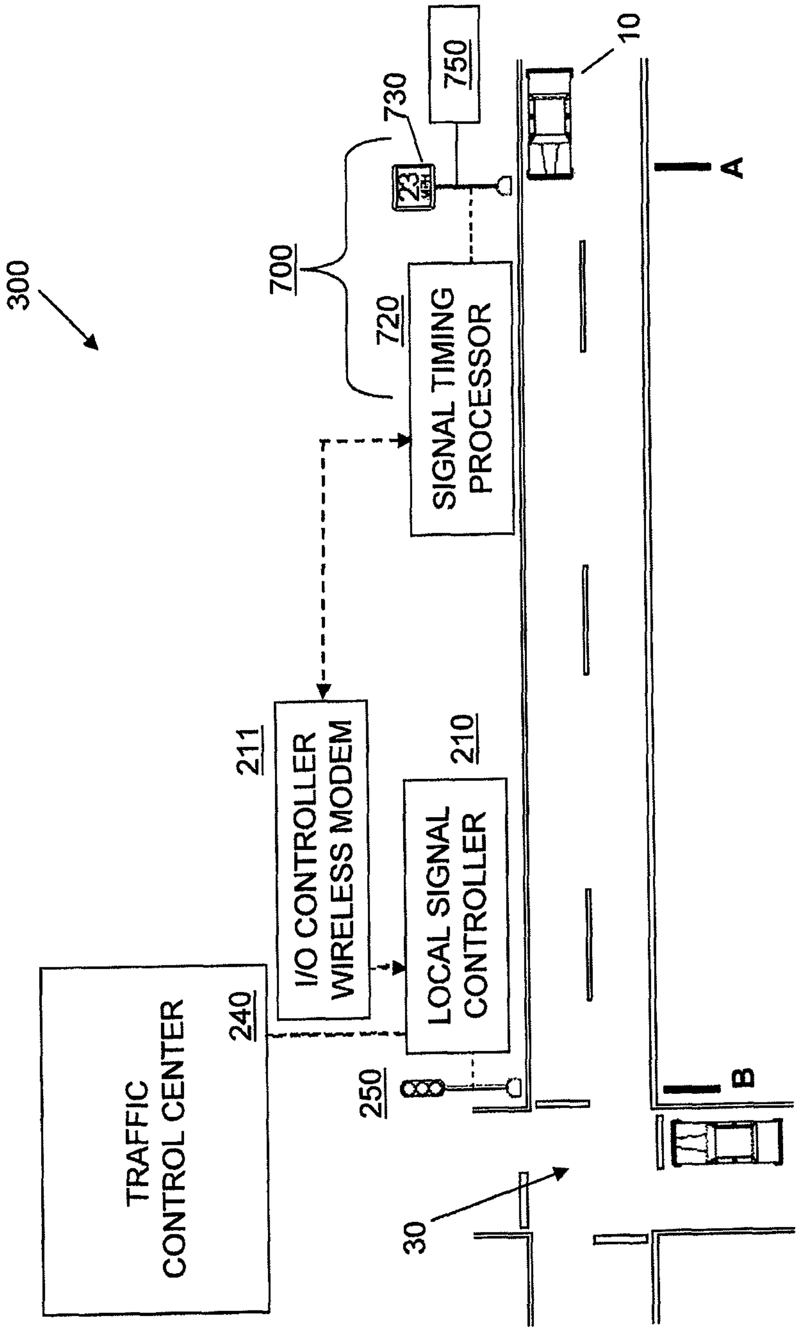
FIG. 7 is a view of an embodiment of a traffic management system including a motion detector, in accordance with aspects of the present invention.

FIG. 7 is a view of another embodiment of a traffic management system 700 including a motion detector 750, in accordance with aspects of the present invention. The traffic management system 700 is similar to the traffic management systems 200 described above with regard to the embodiments of FIGS. 2-4, except that the traffic management 700 includes the motion detector 750. In this embodiment, the motion detector 750 detects an approaching vehicle 10 proximal to position A and activates (or "wakes up") system 700, which in turn causes display 730 to show the optimal speed. This permits the system 700, or at least display 730, to enter a sleep mode, thereby reducing power consumption thereof during periods where there is little to no traffic.

Figure 8:
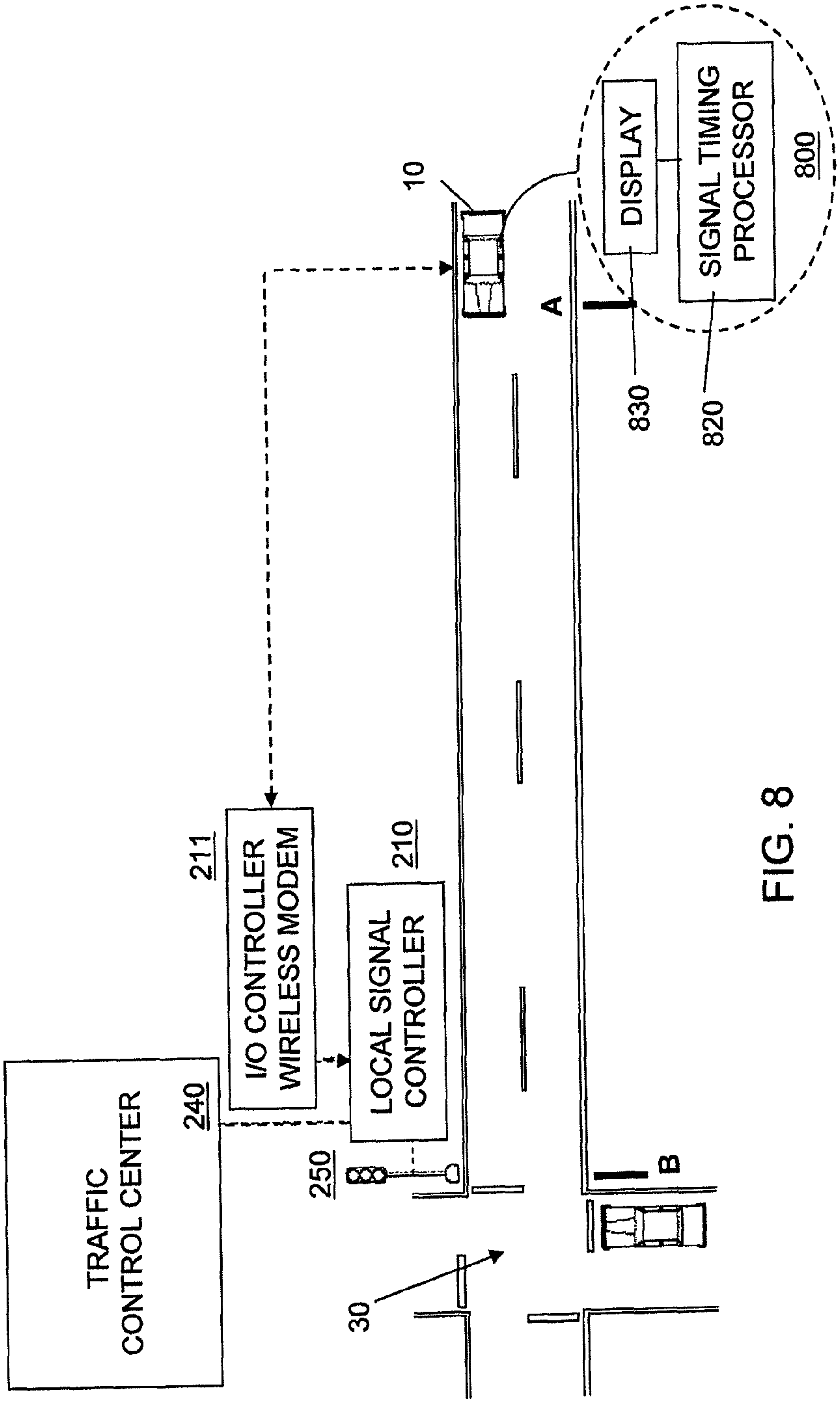
FIG. 8 is a view of an embodiment of a traffic management system positioned in a vehicle, in accordance with aspects of the present invention.

FIG. 8 represents another alternative embodiment of a traffic management system 800. The traffic management system 800 includes an output device 830 and a signal timing processor 820 that can be located in a vehicle that is traveling along a roadway that includes an intersection having a traffic signal 250. Here, the output device 830 can receive information related to timing as to when a green light will be illuminated, as well as information related to a distance between the vehicle at the first position A and the second position B. Signal timing information can be, for example, received via a wireless network from local signal controller 210, traffic control center 240, or some intermediate system. In this embodiment, distance information can be determined, for example, via a GPS or other mechanisms. In other embodiments, the output device 830 can be located in the vehicle and communicate with the signal timing processor 820 that is in a different location, external to the vehicle, for example, collocated with a local signal controller 250, traffic control center 240, a roadside structure, or some intermediary system. For example, the output device 830 could include video, graphics, audio, or both, and be part of a GPS/navigation system, a cell phone (or smart phone), PDA, or onboard vehicle information system.

Figure 9:
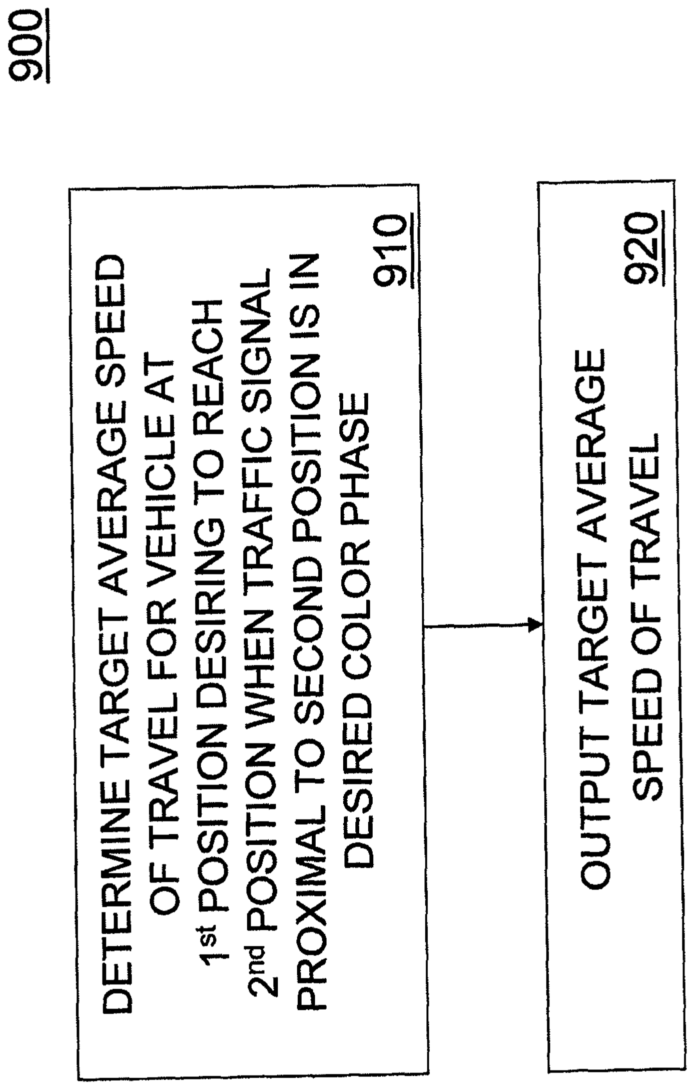
FIG. 9 is a flowchart depicting an embodiment of a method of informing a vehicle operator of a target average speed of travel needed to arrive at a traffic signal having a desired state, in accordance with aspects of the present invention.

FIG. 9 is a flowchart depicting an embodiment of a method 900 of informing a vehicle operator of an optimal speed to pass through a next intersection without stopping, in accordance with aspects of the present invention.

In step 910, a target average speed of travel (or optimal speed) is determined for a vehicle at a first position desiring to reach a second position when a traffic signal proximal to the second position is in a first color phase, for example, when a green light is illuminated.

In step 920, the target average speed of travel is displayed. The target average speed of travel is displayed, for example, on a display similar to those described with regard to the embodiments herein.

Thus, the advantages of a traffic management system in accordance with this disclosure over a conventional system can include the following: (1) reduced gasoline consumption; (2) reduced toxic emissions; (3) minimized aggressive driver behavior; (4) improved vehicular and pedestrian safety; (5) shortened commute times; (6) reduced roadway congestion; (7) new sources of revenue flowing from use of the display, for example, for commercial advertising, and (8) improved awareness from use of the display of various alerts (e.g., traffic alerts, weather alerts, Amber alerts . . . )

While embodiments illustrating the present invention have been particularly shown and described with reference to exemplary drawings hereof, it will be understood by those of ordinary skill in the art that various changes in form and details may be made therein without departing from the spirit and scope of the invention.

What is claimed is:

1. A traffic management system, comprising:

a signal timing processor configured to determine a target average speed of travel between a first position and a second position that must be achieved by a vehicle at the first position to reach the second position when a signaling device proximal to the second position is in a first state of a plurality of states; and an output device stationary relative to the vehicle and positioned at a fixed distance from the signaling device that outputs the target average speed at the vehicle.

2. The system of claim 1, wherein the first state is a go state.

3. The system of claim 1, wherein the signaling device is a traffic signal.

4. The system of claim 3, wherein the traffic signal includes a green light, an amber light, and a red light, and the green light is the first state.

5. The system of claim 1, wherein the output device includes a stationary roadside device that includes a display of the target average speed.

6. The system of claim 1, wherein the output device displays the target average speed as a number of miles per hour or kilometers per hour.

7. The system of claim 1, wherein the output device includes a first region that displays the target average speed and a second region that displays a second set of information.

8. The system of claim 7, wherein the second region includes a company logo.

9. The system of claim 7, wherein the second region is a dynamic display.

10. The system of claim 9, wherein the dynamic display displays one or more of alerts, advertisements, temperature, and travel information.

11. The system of claim 1, wherein the signal timing processor is configured to determine a target average speed based on a set of inputs including the fixed distance between the first and second positions and traffic signal sequence information.

12. The system of claim 11, wherein the set of inputs further includes at least one speed limit.

13. The system of claim 11, wherein the set of inputs includes traffic congestion information.

14. The system of claim 1, further comprising:

a motion detector that activates at least one of the signal timing processor and the output device in response to a detected motion of the vehicle.

15. A traffic management system, comprising:

a signal timing processor configured to determine a target average speed of travel between a first position and a second position that must be achieved by a vehicle at the first position to reach the second position when a traffic signal at the second position is in go state; and a display device that outputs the target average speed as a number that is visible from the vehicle, wherein the signal timing processor is configured to determine a target average speed based on a set of inputs including a fixed distance between the first and second positions and traffic signal sequence information.

16. A method of informing an operator of a vehicle of target average speed to travel to arrive at a multi-state signaling device when the signaling device is in a go state, the method comprising:

storing a location of the multi-state signaling device in a memory;

determining a vehicle location;

receiving information indicating a timing sequence and state of the multi-state signaling device;

determining the target average speed of travel between a vehicle position and the multi-state signaling device that must be achieved to reach the multi-state signaling device during the go state; and outputting, at an output device stationary relative to the vehicle and positioned at a fixed distance from the signaling device, the target average speed of travel at the vehicle.

* * * * *